(12) United States Patent
Rezeanu (10) Patent No.: US 9,521,730 B2
(45) Date of Patent: Dec. 13, 2016

(54) DIGITAL COMMUNICATION INTERFACE CIRCUIT FOR LINE-PAIR WITH DUTY CYCLE IMBALANCE COMPENSATION

(71) Applicant: KONINKLIJKE PHILIPS N.V., Eindhoven (NL)

(72) Inventor: Stefan-Cristian Rezeanu, Collierville, TN (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/415,642

(22) PCT Filed: Jul. 17, 2013

(86) PCT No.: PCT/IB2013/055882
§ 371 (c)(1),
(2) Date: Jan. 19, 2015

(87) PCT Pub. No.: WO2014/013454
PCT Pub. Date: Jan. 23, 2014

(65) Prior Publication Data
US 2015/0223306 A1    Aug. 6, 2015

Related U.S. Application Data

(60) Provisional application No. 61/673,780, filed on Jul. 20, 2012.

(51) Int. Cl.
*H05B 37/02* (2006.01)
*H04L 25/02* (2006.01)

(52) U.S. Cl.
CPC ....... *H05B 37/0254* (2013.01); *H04L 25/0266* (2013.01); *H04L 25/0274* (2013.01)

(58) Field of Classification Search
CPC ............ H05B 33/0815; H05B 33/0851; H05B 33/0824; H05B 33/0845; H05B 37/029; H05B 33/0848; H05B 33/0827; H05B 33/0887; H05B 37/0254; H05B 33/08; H05B 33/0803; H05B 33/0809; H05B 33/083
See application file for complete search history.

(56) References Cited

U.S. PATENT DOCUMENTS

2004/0225811 A1  11/2004  Fosler
2005/0152440 A1   7/2005  Beij et al.
(Continued)

FOREIGN PATENT DOCUMENTS

JP    01208094        2/1989
WO    2011135098 A1   11/2011

*Primary Examiner* — Douglas W Owens
*Assistant Examiner* — Monica King
(74) *Attorney, Agent, or Firm* — Meenakshy Chakravorty (57) ABSTRACT

A circuit (200, 300, 400, 600, 700, 800) interfacing a device (20, 30, 40, 60, 80) with a line-pair includes: a diode bridge (210) having polarity-independent input terminals coupled to the line-pair; a galvanic isolation device (230, 330) receiving a transmit signal and coupling the transmit signal to its output; a variable edge delay circuit (270, 370, 572, 574, 576) that delays rising/falling edges of the transmit signal more than falling/rising edges of the transmit signal; a voltage-controlled variable resistance element (260, 360, 460) connected across output terminals of the diode bridge; and a filter connected to a control terminal of the voltage-controlled variable resistance element. The filter includes decoupled charge and discharge paths to decouple the rise time of the transmit signal from the fall time of the transmit signal. The voltage-controlled variable resistance element couples the transmit signal to the line-pair via the diode bridge.

11 Claims, 8 Drawing Sheets

(56) References Cited

U.S. PATENT DOCUMENTS

| | | | |
|---|---|---|---|
| 2008/0143402 A1 | 6/2008 | Huang et al. | |
| 2008/0179968 A1* | 7/2008 | Szabados | H01H 47/22 307/140 |
| 2009/0003417 A1* | 1/2009 | Boeckle | H05B 37/0254 375/211 |
| 2013/0181630 A1* | 7/2013 | Taipale | H05B 37/0263 315/224 |

* cited by examiner

DIGITAL COMMUNICATION INTERFACE CIRCUIT FOR LINE-PAIR WITH DUTY CYCLE IMBALANCE COMPENSATION

CROSS-REFERENCE TO PRIOR APPLICATIONS

This application is the U.S. National Phase application under 35 U.S.C. §371 of International Application No. PCT/IB2013/055882, filed on Jul. 17, 2013, which claims the benefit of U.S. Provisional Patent Application No. 61/673,780, filed on Jul. 20, 2012. These applications are hereby incorporated by reference herein.

TECHNICAL FIELD

The present invention is directed generally to a digital communication interface, and more particularly to an interface circuit for interfacing a device with a line-pair such as a Digital Addressable Lighting Interface (DALI).

BACKGROUND

In recent years, new or more stringent demands have been imposed on lighting systems, such as increased requirements for energy conservation, and the need to accommodate an increasing variety of different types of lighting units which employ different types of light sources (e.g., incandescent, fluorescent, light emitting diode, etc.) with different driving requirements, with different types of lighting units often being deployed within a same building or even the same room. These demands have driven needs for more options and flexibility in the control of the lighting units within a facility. These needs, in turn, have led to the development and installation of lighting networks within many facilities.

In particular, the lighting industry has developed the Digital Addressable Lighting Interface (DALI) standard for digital communications between the individual components of a lighting system which are connected in alighting network. A wide variety of different DALI devices from different manufacturers can be connected together and integrated into alighting system. This provides a high level of flexibility in configuring alighting system while being assured of interoperability between all of the devices. Control and address capabilities allow a DALI compliant lighting system to individually control the light level of each of the luminaries as well as easily controlling light levels for groups of luminaries.

To maintain this interoperability, the DALI standard imposes requirements on the interfaces of control devices and slave devices for compatibility with other devices on a DALI bus. DALI interfaces are connected to a two-wire differential control/data bus which is common to groups of DALI interfaces. DALI messages are serial data streams and comply with a bi-phase coding, Manchester IEEE 802.3, in which the bit transitions occur between the typical voltage levels of 16 volts (H) and 0 volts (L).

Figure 1:
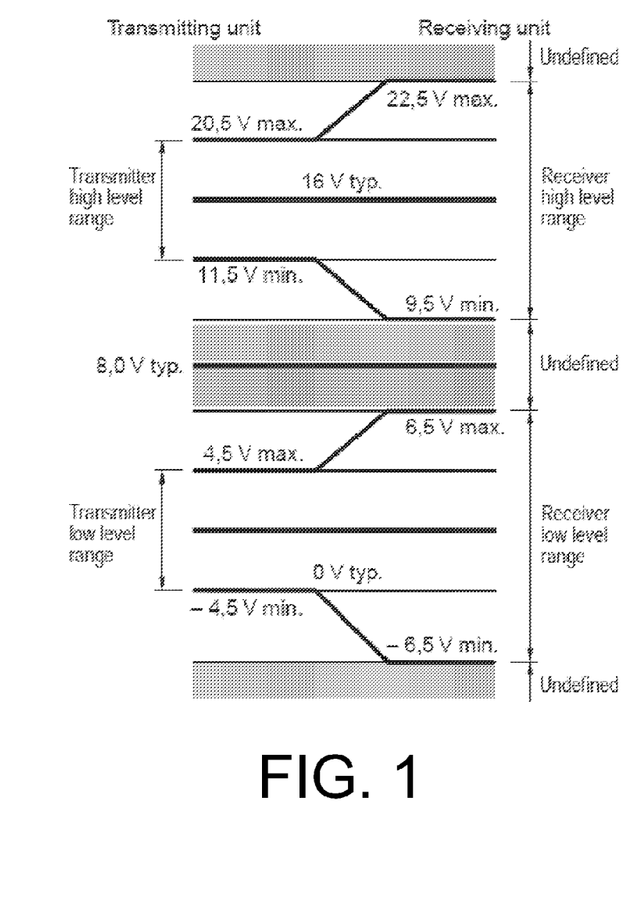
FIG. 1 illustrates voltage range relationships for the two differential voltage lines ("line-pair") of a DALI bus at both the transmitting and the receiving units.

FIG. 1 illustrates the voltage range relationships for the differential two-wire line (a "line-pair") of a DALI bus (which may sometimes also be referred to as a DALI loop or DALI network). A power source is usually incorporated in the master controller, providing the necessary voltage level on the DALI bus. Each DALI interface receives information by determining the voltage changes representing the bit values, and transmits information by either not clamping or clamping (shorting) the voltage across the two-wire DALI bus.

The DALI standard imposes requirements on the duty cycle of the signals transmitted on a DALI bus. Here, the duty cycle may be considered to be the percentage of time that the transmitted signal is in the "high" state (e.g., corresponding to a logical 1) or conversely, the percentage of time that the transmitted signal is in the "low" state (e.g., corresponding to a logical 0) during a bi-phase encoded data bit. In particular, the duty cycle should lie in a specified range around an ideal 50% duty cycle. The DALI standard also imposes both upper and lower limits on the rise and fall times (edge transitions) of the signals transmitted on a DALI bus. Compliance with these requirements must be ensured by the interface circuits of DALI devices.

To address these requirements, several different communication interface circuits have been developed. In particular, examples of DALI interface circuits are disclosed in: U.S. Patent Application Publication 2004/0225811; U.S. Patent Application Publication 2005/0152440; U.S. Patent Application Publication 2008/0143402; and U.S. Patent Application Publication 2009/0003417.

However, each of these communication interface circuits has certain disadvantages or limitations pertaining to complexity, cost, and/or performance.

Thus, it would be desirable to provide a communication interface circuit which can provide flexible control of the duty cycle of DALI signals without undue complexity and cost. In particular it would be desirable to provide a communication interface circuit which can maintain a duty cycle of DALI signals to be within a specified range, as tight as possible around the ideal 50% value, while taking into account variations in the specified performance of electrical components of the interface circuit. It would further be desirable to provide such a communication interface circuit which can provide flexible control of the rise and fall times of the edge transitions of the DALI signals.

SUMMARY

The present disclosure is directed to inventive methods and apparatus for interfacing a device to a line-pair for digital communication, and more particularly to an interface circuit for interfacing a device to a line-pair such as a Digital Addressable Lighting Interface (DALI) bus.

Generally, in one aspect, a device includes an interface circuit configured to interface a controller with a Digital Addressable Lighting Interface (DALI) bus. The interface circuit includes: a diode bridge having polarity-independent input terminals configured to be coupled to the DALI bus, and further having a positive output terminal and a negative output terminal; a variable edge delay circuit configured to receive a transmit signal generated by the controller and to delay rising edges of the transmit signal substantially more than falling edges of the transmit signal, or to delay falling edges of the transmit signal substantially more than rising edges of the transmit signal; an optocoupler having a pair of input terminals configured to receive the transmit signal from the variable edge delay circuit and having first and second output terminals; an amplifier having an input terminal and an output terminal, wherein the input terminal is connected to one of the first and second output terminals of the optocoupler; a voltage-controlled variable resistance element connected across the positive and negative output terminals of the diode bridge, and having a control terminal for varying a resistance thereof; and a first filter connected between the output terminal of the amplifier and a control terminal of the voltage-controlled variable resistance element, wherein the first filter includes decoupled charge and discharge paths so as to decouple a rise time of the transmit signal from a fall time of the transmit signal. The voltage-controlled variable resistance element is operatively connected to the diode bridge and configured to couple the transmit signal to the DALI bus via the diode bridge.

In one embodiment, the variable edge delay circuit includes a low pass filter.

In another embodiment, the interface circuit further includes a transmit voltage supply and a transmit voltage reference for setting a voltage of the transmit voltage supply, wherein the transmit voltage supply is connected to a supply terminal of the amplifier, and wherein the transmit voltage reference is supplied a current from the DALI bus.

According to one optional feature of this embodiment, the optocoupler includes a transistor, wherein the first output terminal of the optocoupler is connected to a collector of the transistor and the second output terminal of the optocoupler is connected to an emitter of the transistor, and wherein the input terminal of the amplifier is connected to the first output terminal of the optocoupler.

According to one optional feature of this embodiment, the amplifier includes: a PNP transistor having an emitter connected to the transmit voltage supply, a base connected to the first output terminal of the optocoupler, and a collector connected to an input terminal of the first filter; and a resistor connected between the base and the emitter of the PNP transistor.

According to one optional feature of this embodiment, the variable edge delay circuit is configured to delay rising edges of the transmit signal substantially more than falling edges of the transmit signal.

According to another optional feature of this embodiment, the amplifier includes a current mirror having a pair of matched transistors and at least one resistor connected in series with the emitter of at least one of the matched transistors.

According to still another optional feature of this embodiment, the transistor of the optocoupler operates in an active region while communicating the transmit signal to the input terminal of the amplifier.

According to a further optional feature of this embodiment, the first output terminal of the optocoupler is connected to a collector of the transistor and the second output terminal of the optocoupler is connected to an emitter of the transistor, and wherein the input terminal of the amplifier is connected to the second output terminal of the optocoupler.

According to yet another optional feature of this embodiment, the amplifier includes a transistor, and wherein the transistor of the amplifier forms a Darlington pair with the transistor of the optocoupler.

According to one optional feature of this embodiment, the transistor of the optocoupler operates in a saturated region while communicating the transmit signal to the input terminal of the amplifier.

Generally, in another aspect a device includes an interface circuit configured to interface the device with a line-pair. The interface circuit includes: a diode bridge having polarity-independent input terminals coupled to the line-pair, and further having a positive output terminal and a negative output terminal; a galvanic isolation device having an input and an output which are galvanically isolated from each other, the galvanic isolation device being configured to receive a transmit signal at the input and to couple the transmit signal at the output; a variable edge delay circuit configured to delay rising edges of the transmit signal substantially more than falling edges of the transmit signal, or to delay falling edges of the transmit signal substantially more than rising edges of the transmit signal; a voltage-controlled variable resistance element connected across the positive and negative output terminals of the diode bridge; and a first filter connected having an input configured to receive the transmit signal and having an output connected to a control terminal of the voltage-controlled variable resistance element, wherein the first filter includes decoupled charge and discharge paths so as to decouple a rise time of the transmit signal from a fall time of the transmit signal. The voltage-controlled variable resistance element is operatively connected to the diode bridge and configured to couple the transmit signal to the line-pair via the diode bridge.

In one embodiment, an output of the variable edge delay circuit is connected to the input of the galvanic isolation device.

According to one optional feature of this embodiment the variable edge delay circuit includes a low pass filter.

According to another optional feature of this embodiment, the interface circuit further includes an amplifier having an input connected to an output of the galvanic isolation device and having an output connected to supply the transit signal from the galvanic isolation device to the input of the first filter.

According to one optional feature of this embodiment the interface circuit further includes a transmit voltage supply and a transmit voltage reference for setting a voltage of the transmit voltage supply, wherein the transmit voltage supply is connected to a supply terminal of the amplifier, and wherein the transmit voltage reference is supplied a current from the line pair.

According to one optional feature of this embodiment, the galvanic isolation device includes an optocoupler. The optocoupler further includes: a pair of input terminals configured to receive the transmit signal from the variable edge delay circuit, and an output transistor having a collector and an emitter, wherein the collector is connected to the transmit voltage supply and the emitter is connected to the input of the amplifier.

According to another optional feature of this embodiment the galvanic isolation device includes an optocoupler. The optocoupler further includes: a pair of input terminals configured to receive the transmit signal from the variable edge delay circuit, and an output transistor having a collector and an emitter, wherein the collector is connected to the input of the amplifier and the emitter is connected to the negative output terminal of the diode bridge.

According to yet another optional feature of this embodiment, the galvanic isolation device includes an optocoupler. The optocoupler further includes: a pair of input terminals configured to receive the transmit signal from the variable edge delay circuit, and an output transistor having a collector and an emitter, wherein the collector is connected to the transmit voltage supply and the emitter is connected to the input of the first filter.

According to one optional feature of this embodiment, the transistor of the optocoupler operates in a saturated region while communicating the transmit signal to the input of the first filter.

In yet another embodiment, the variable edge delay circuit is connected on an output other side of the galvanic isolation device between any two blocks in a signal path between the galvanic isolation device and the voltage-controlled variable resistance element.

In still another embodiment, the interface circuit further includes an amplifier, and the variable edge delay circuit is connected in one selected among a group of positions consisting of: between the galvanic isolation device and the amplifier; between the amplifier and the first filter, and between the first filter and the voltage-controlled variable resistance element.

As used herein for purposes of the present disclosure, the term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources and other types of electroluminescent sources. A "lighting driver" is used herein to refer to an apparatus that supplies electrical power to one or more light sources in a format to cause the light sources to emit light. In particular, a lighting driver may receive electrical power in a first format (e.g., AC Mains power; a fixed DC voltage; etc.) and supplies power in a second format that is tailored to the requirements of the light source(s) (e.g., LED light source(s)) that it drives.

The term "lighting module" is used herein to refer to a module, which may include a circuit board (e.g., a printed circuit board) having one or more light sources mounted thereon, as well as one or more associated electronic components, such as sensors, current sources, etc., and which is configured to be connected to a lighting driver. Such lighting modules may be plugged into slots in a lighting fixture, or a motherboard, on which the lighting driver may be provided. Such lighting modules may be plugged into slots in a lighting fixture, or a motherboard, on which the lighting driver may be provided.

The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry; a lighting driver) relating to the operation of the light source(s).

The terms "lighting fixture" and "luminaire" are used herein interchangeably to refer to an implementation or arrangement of one or more lighting units in a particular form factor, assembly, or package, and may be associated with (e.g., include, be coupled to and/or packaged together with) other components.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which may employ one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

As used herein, the term "approximately" means within a range of +/−5% The term "substantially the same" means within a range of +/−10% of being exactly the same. The term "substantially equal to" means within a range of +/−10% of being exactly equal. The terms "substantially less than" and "substantially more than" mean at least 10% less than, and at least 10% more than, respectively.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

As discussed above, there is a general need for a communication interface circuit which can ensure that signals transmitted by the interface satisfy specified upper and lower limits on the rise and fall times of edge transitions of signals transmitted by the interface circuit, as well as maintaining a duty cycle within a specified range—usually a specific range around an ideal 50% duty cycle.

Therefore, the present inventor has recognized and appreciated that it would be beneficial to provide a communication interface circuit which provides more flexible control of the duty cycle of a transmitted signal. The present inventor has also recognized and appreciated that it would be further beneficial to provide a communication interface circuit which also provides more flexible control of the rise time and fall time of a transmitted signal.

In view of the foregoing, various embodiments and implementations of the present invention are directed to a communication interface circuit and a device that includes a communication interface circuit. In particular, various embodiments and implementations of the present invention are directed to an interface circuit which includes a circuit for compensating for asymmetry in the duty cycle of a transmit signal which may be introduced by other components of the interface circuit. Additionally, various embodiments and implementations of the present invention are directed to an interface circuit which also decouples the rise time and fall time of edge transitions of a transmitted signal. Furthermore, various embodiments and implementations of the present invention are directed to an interface circuit which can achieve an additional slowdown of the falling edge transition, which in some implementations is typically faster than the rising edge transition.

Many prior art DALI interface circuits employ an optocoupler to provide galvanic isolation between the microcontroller of a DALI device and he DALI bus. This optocoupler is then used to drive the remaining components of the interface circuit in the signal path to the DALI bus.

An important parameter for optocouplers is its transfer efficiency, usually measured in terms of their current transfer ratio (CTR) which is the ratio of the phototransistor collector current $I_C$ to the LED forward current $I_F$: $CTR=I_C/I_F$.

The present inventor has also realized and appreciated that the CTR of an optocoupler often is specified with a very wide tolerance. The CTR can vary widely from one optocoupler device to another, in particular even among individual devices of the same model optocoupler. For example, one known optocoupler specifies a device-to-device variation in the CTR from 100% to 300% In follows that in the context of manufacturing an interface circuit which has been designed with a particular optocoupler model, there will be a substantial CTR variation from interface circuit to interface circuit. The CTR is also a function of temperature, of $I_C$, and is different when the output transistor of the optocoupler is operated in an active region (higher CTR) as compared to when the output transistor of the optocoupler is operated in a saturated region (lower CTR).

The present inventor has also realized and appreciated that wide variations in the CTR of the optocoupler can make it difficult to ensure that during a DALI back frame, the interface circuit is able to pull the DALI bus down (i.e., short it) to a logical 0 level with a sufficiently low resistance and sink the required current (e.g., around 250 mA) to communicate a data value of 0.

It is possible to obtain optocouplers whose CTR is specified within a tighter tolerance, but this can add significant to the cost of the interface circuit.

Accordingly, in some embodiments of an interface circuit a voltage may be stored during the forward frame, and then discharged during the backframe to turn on a device for shorting the DALI bus to transmit a logical 0. Furthermore, in some embodiments of an interface circuit an amplifier (e.g., a high gain amplifier) is provided between the optocoupler output and the control terminal of a voltage-controlled variable resistance element (e.g., afield effect transistor (FE)) which is employed to communicate the transmit data to the DALI bus.

The present inventor has additionally realized and appreciated that when a transmit signal is coupled through an optocoupler, the delays applied by the optocoupler to the rising and falling edges are not symmetrical and are a function of the CTR. Therefore, the optocoupler changes the duty cycle of the transmit signal, and may cause the duty cycle of a transmit signal to be asymmetrical and lie outside a range specified by the DALI standard.

The present inventor has further realized and appreciated that the addition of such an amplifier between the optocoupler output and the control terminal of the voltage-controlled variable resistance element can introduce increased duty cycle asymmetry in the transmit signal. For example, in some embodiments the amplifier may have a variable (gain-dependent) falling edge delay, typically due to the storage time of the output device coming out of saturation.

To address these issues, in some embodiments an interface circuit includes a variable edge delay circuit configured to delay rising edges of the transmit signal substantially more than falling edges of the transmit signal, or to delay falling edges of the transmit signal substantially more than rising edges of the transmit signal. The variable edge delay circuit may operate as a duty cycle compensation circuit to compensate for duty cycle asymmetry introduced into the transmit signal by other elements of the interface circuit, for example the optocoupler and/or amplifier as discussed above. The variable edge delay circuit may be disposed on an output side of the optocoupler, but in a beneficial feature, the variable edge delay circuit may be disposed at the input side of the optocoupler so as to take advantage of the unidirectional device (diode) at the input of the optocoupler. For example, as explained above in some embodiments the amplifier may have a variable (gain-dependent) falling edge delay, and in that case the variable edge delay circuit may delay the opposite edge at the input of the optocoupler.

Furthermore, in some embodiments, the variable edge delay circuit may be employed to compensate for duty cycle asymmetry introduced into the transmit signal without including the amplifier between the optocoupler output and the control terminal of the voltage-controlled variable resistance element. Such embodiments may have advantages in terms of simplicity and reduced current consumption, but at the expense of requiring the optocoupler to have an increased minimum CRT.

Figure 2:
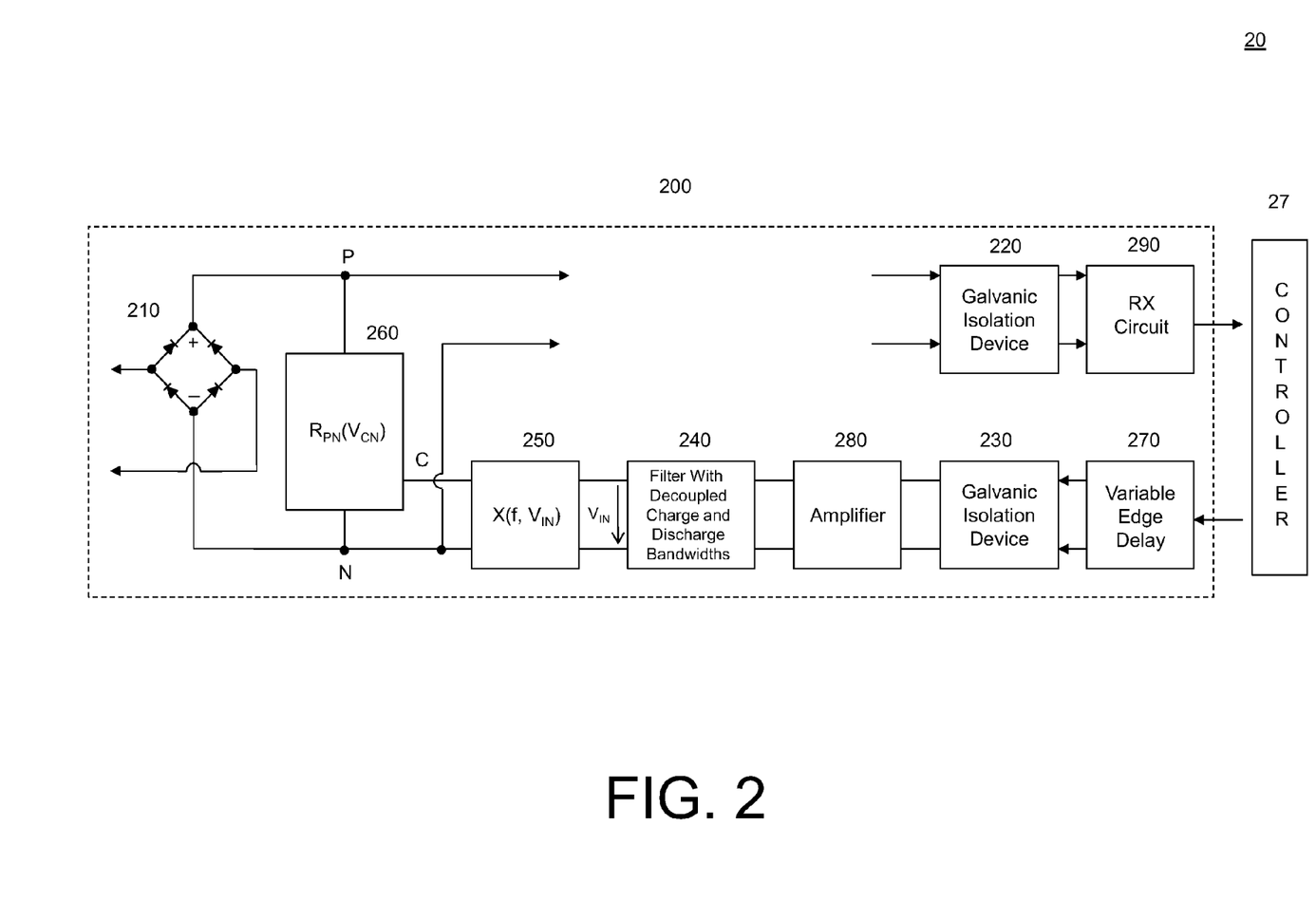
FIG. 2 is a functional block diagram of one embodiment of a device having an interface circuit for interfacing the device to a DALI bus.

To provide a concrete illustration of the inventive concepts disclosed in this patent application, FIG. 2 is a functional block diagram of one embodiment of a device 20 having an interface circuit 200 for interfacing the device to a DALI bus. It should be understood that a DALI device is being provided as an example application for the inventive concepts, but the inventive concepts may be applied to other communication interfaces, and particularly to interface circuits for interfacing devices to other line-pairs.

In the example illustrated in FIG. 2, device 20 is a DALI device, and may include a controller 27 for controlling an operation of one or more lighting units or luminaries via signals communicated over the DALI bus. Each lighting unit or luminaire may include alighting driver and/or a ballast, together with one or more light sources.

Interface circuit 200 includes: a diode bridge 210; a first galvanic isolation device 220; a second galvanic isolation device 230; a first filter 240; a second filter 250; a voltage-controlled variable resistance element 260; a variable edge delay circuit 270; an amplifier 280; and a receive signal conditioning circuit 290.

Diode bridge 210 has a pair of polarity-independent input terminals coupled to a line-pair (e.g., a DALI bus), and also has a positive output terminal and a negative output terminal.

First galvanic isolation device 220 is operatively connected to diode bridge 210 and outputs a receive signal received on the DALI bus via diode bridge 210. In device 20, first galvanic isolation device 220 outputs the receive signal to controller 27 of device 20 via receive signal conditioning circuit 290. First galvanic isolation device 220 provides an ability for interface circuit 200 to communicate the receive signal to controller 27 while maintaining galvanic isolation between the DALI bus and interface circuit 200 on one side, and the rest of device 20, including controller 27, on the other side. In particular, first galvanic isolation device 220 provides galvanic isolation between an input at input terminals thereof, and an output at output terminals thereof.

Variable edge delay circuit 270 is configured to receive a transmit signal generated by controller 27 and to delay rising edges of the transmit signal substantially more than falling edges of the transmit signal, or to delay falling edges of the transmit signal substantially more than rising edges of the transmit signal. Variable edge delay circuit 270 may operate as a duty cycle compensation circuit to compensate for duty cycle asymmetry introduced into the transmit signal by other elements of interface circuit 200, for example second galvanic isolation device 230 and/or amplifier 280 as discussed above. Further details of various embodiments of variable edge delay circuit 270 will be described below.

Second galvanic isolation device 230 is configured to receive a transmit signal from controller 27 of device 20 via variable edge delay circuit 270. Second galvanic isolation device 230 provides an ability for interface circuit 200 to receive the transmit signal from controller 27 while maintaining galvanic isolation between the DALI bus and interface circuit 200 on one side, and the rest of device 20, including controller 27, on the other side. In particular, second galvanic isolation device 230 provides galvanic isolation between an input at input terminals thereof, and an output at output terminals thereof.

Voltage-controlled variable resistance element 260 is connected across the positive and negative output terminals of diode bridge 210, denoted in FIG. 2 as nodes P and N, respectively. In particular, voltage-controlled variable resistance element 260 has a first terminal connected to the positive output terminal of diode bridge 210 and a second terminal connected to the negative output terminal of diode bridge 210. Voltage-controlled variable resistance element 260 also has a control terminal which is connected to the output of second filter 250 at anode denoted as C in FIG. 2 and to which a control voltage $V_{CN}$ is applied which varies the resistance $P_{PN}$ of voltage-controlled variable resistance element 260. That is, the resistance of voltage-controlled variable resistance element 260 between nodes P and N is a function of the voltage between nodes C and N: $P_{PN}(V_{CN})$. In some embodiments, voltage-controlled variable resistance element 260 has a variable resistance $P_{PN}$ which varies over a range of a low value of a few ohms (e.g., <10 ohms, such as 2-8 ohms) to a high value of several mega ohms. Interface 200 transmits a high voltage value (e.g., a voltage range of 16 volts±6.5 volts) to the line-pair (e.g., DALI bus) by raising voltage-controlled variable resistance element 260 to have a high resistance $P_{PN}$ (e.g., >1 M•), and transmits a low voltage value (e.g., a voltage range of 0 volts±6.5 volts) to the DALI bus by causing voltage-controlled variable resistance element 260 to have a low resistance P (e.g., <10•). In the context of a DALI bus, data is transmitted at a given information rate (e.g., 1200 bits/s) using Manchester encoding, so that every data bit includes a portion with a high voltage value and a portion with a low voltage value. In some embodiments, voltage-controlled variable resistance element may comprise a field effect transistor (FET). In some embodiments, voltage-controlled variable resistance element 260 may have a threshold voltage $V_{TH}$ of 3-4 volts, wherein the resistance $P_{PN}$ is very low (e.g., <10•) for a control or input voltage $V_{CN}$ that is greater than the threshold voltage, and the resistance $P_{PN}$ is very high (e.g., >1 M•) for a control or input voltage $V_{CN}$ that is less than the threshold voltage.

Amplifier 280 has an input terminal for receiving the transmit signal from second galvanic isolation device 230 and an output terminal for providing the transmit signal to the input of first filter 240.

First and second filters 240 and 250 are cascaded (a series connection) between second galvanic isolation device 230 and voltage-controlled variable resistance element 260 and provide a means for individually adjusting or controlling the rise time and fall time of edge transitions of data transmitted by interface 200. More specifically, first and second filters 240 and 250 receive a transmit signal comprising transmit data (for example data generated by processor 27) via second galvanic isolation device 230 and condition the transition edges of that transmit signal before supplying the transmit data to voltage-controlled variable resistance element 260 so as to control the EMI generated by interface 200.

First filter 240 includes decoupled charge and discharge paths for the transmit signal which is communicated from second galvanic isolation device 230 via amplifier 280. By decoupling the charge and discharge paths in first filter 240, the rise time and the fall time of the transmit signal may be separately adjusted so as to be different from each other, providing increased flexibility for managing the edge transitions of the transmit signal, and thereby managing the EMI generated by interface circuit 200. For example, in some embodiments first filter 240 may slow down the fall time of data transitions in the transmit signal to a lesser degree with respect to the rise time of data transitions in the transmit signal so as to manage the EMI generated by interface circuit 200 in a desirable fashion.

Second filter 250 has a transfer function whose frequency response is a function of the input voltage shown as $V_{IN}$ in FIG. 2: $X(f, V_{IN})$. Beneficially, second filter 250 has a voltage-dependent frequency response such that its bandwidth is reduced in a voltage region where the resistance of voltage-controlled variable resistance element 260 is decreasing so as to pull the voltage on the DALI bus low. This may achieve a desirable additional slowdown of the falling edge transitions of the transmit signal on the DALI bus, which may otherwise be faster than the rising edge transitions. Accordingly, the overall EMI generated from interface 200 may be reduced while still meeting the data transition time requirements of a DALI interface.

In some embodiments, second filter 250 may be omitted, thereby providing an advantage of simplicity but in some cases incurring a disadvantage in terms of reduced flexibility and degraded EMI performance.

In an alternative arrangement, variable edge delay circuit 270 may be connected on the output side of second galvanic isolation device 230, inserted between any two blocks in the series circuit path between second galvanic isolation device 230 and voltage-controlled variable resistance element 260. For example, variable edge delay circuit 270 may be moved, to between second galvanic isolation device 230 and amplifier 280, or between amplifier 280 and first filter 240, or between first filter 240 and second filter 250, or between second filter 250 and voltage-controlled variable resistance element 260.

Figure 3:
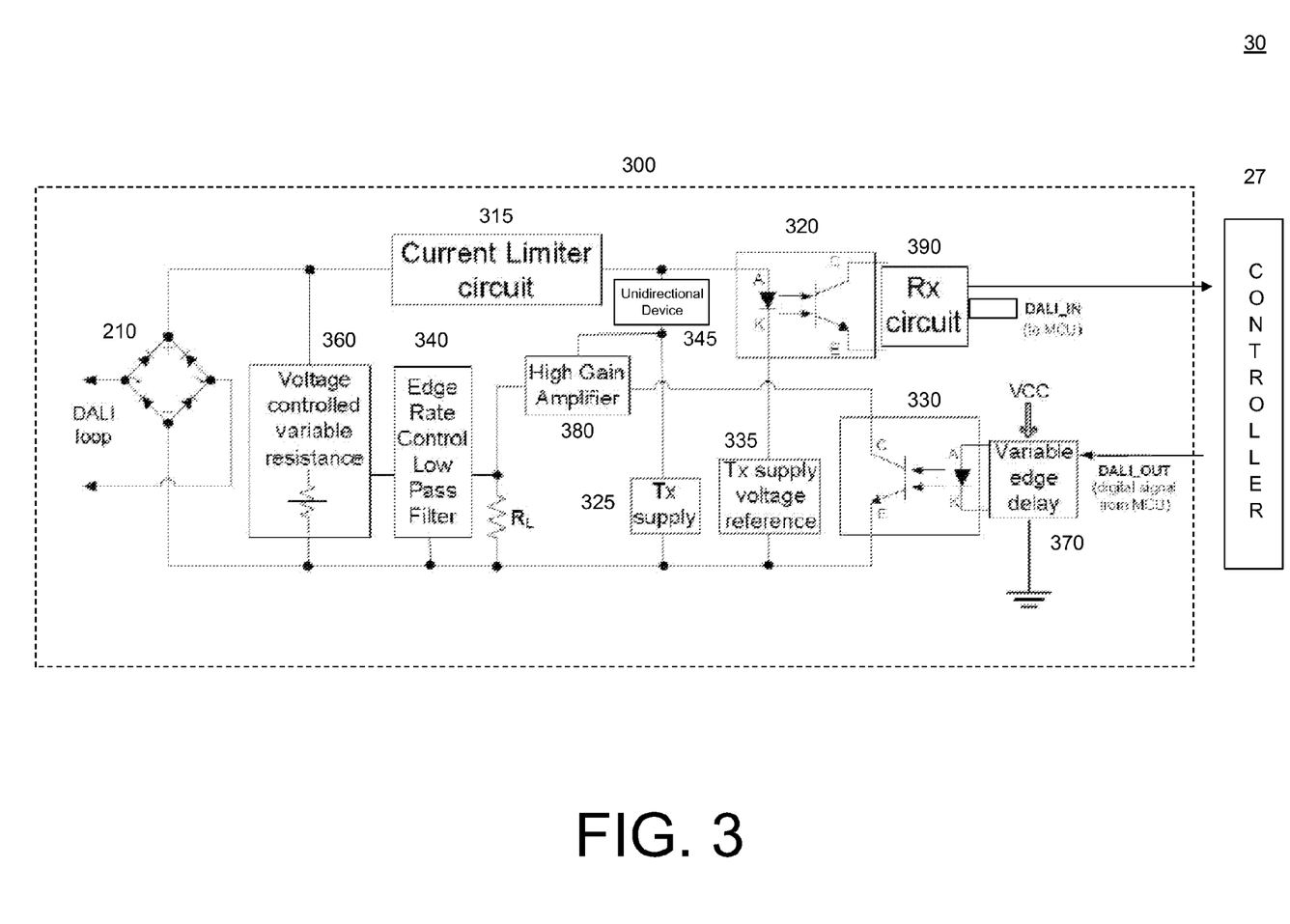
FIG. 3 is a detailed block diagram of one embodiment of a device having an interface circuit for interfacing the device to a DALI bus.

FIG. 3 is a more detailed block diagram of one embodiment of a device 30 having an interface circuit 300 for interfacing the device to a DALI bus. In particular, device 30 may be one example embodiment of device 20, and interface circuit 300 may be one example embodiment of interface circuit 200.

In the example illustrated in FIG. 3, device 30 is a DALI device, and may include controller 27 for controlling an operation of one or more lighting units or luminaries via signals communicated over the DALI bus. Each lighting unit or luminaire may include alighting driver and/or a ballast, together with one or more light sources.

Interface circuit 300 includes: diode bridge 210; a first optocoupler 320; a second optocoupler 330; an edge rate control low pass filter 340; a voltage-controlled variable resistance 360; a transmit voltage supply 325; a transmit voltage reference 335; a current limiter 315; a first unidirectional device 345; a variable edge delay circuit 370; and amplifier 380; and a receive signal conditioning circuit 390.

First optocoupler 320 has first and second input terminals and first and second output terminals. The first input terminal is operatively connected to diode bridge 210 via current limiter 315, and the output terminals are configured to output a receive signal received on the DALI bus via diode bridge 210. In device 30, the receive signal is output to controller 27 of device 30, for example via a receive signal conditioning circuit. First optocoupler 320 is one embodiment of a galvanic isolation device and in principle a different galvanic isolation device could be substituted for it in different embodiments of the interface circuit.

Voltage-controlled variable resistance element 360 operates like voltage-controlled variable resistance element 260 described above and so a description thereof will not be repeated.

Variable edge delay circuit 370 is configured to receive a transmit signal, e.g., a DALI transmit signal DALI_OUT, generated by controller 27 and to delay rising edges of the transmit signal substantially more than falling edges of the transmit signal, or to delay falling edges of the transmit signal substantially more than rising edges of the transmit signal. Variable edge delay circuit 370 may operate as a duty cycle compensation circuit to compensate for duty cycle asymmetry introduced into the transmit signal by other elements of interface circuit 300, for example second optocoupler 330 and/or amplifier 380 as discussed above. Further details of various embodiments of variable edge delay circuit 370 will be described below.

Second optocoupler 330 has first and second input terminals and first and second output terminals. Second optocoupler 330 is configured to receive a transmit signal from variable edge delay circuit 370 between the first and second input terminals. The first output terminal (e.g., collector) of second optocoupler 330 is connected to an input terminal of amplifier 380, and the second output terminal (e.g., emitter) of second optocoupler 330 is connected to the negative output terminal of diode bridge 210. Second optocoupler 330 is one embodiment of a galvanic isolation device and in principle a different galvanic isolation device could be substituted for it in different embodiments of the interface circuit.

Amplifier 380 has an input terminal, an output terminal, and a supply terminal. The input terminal of amplifier 380 is connected to a first output terminal of second optocoupler 330 which is connected to the collector of the output transistor of second optocoupler 330. The output terminal of amplifier 380 is connected to the input of edge rate control filter 340, across the load resistor R, and the supply terminal of amplifier 380 is connected to transmit voltage supply 325. Amplifier 380 receives the transmit signal from second optocoupler 330 and provides the transmit signal to edge rate control filter 340. Beneficially, amplifier 380 allows the output transistor of second optocoupler 330 to remain in an active region while interface circuit 300 transmits the transmit signal.

Edge rate control filter 340 is connected between an output terminal of amplifier 380 and voltage-controlled variable resistance element 360 and provides a means for individually adjusting or controlling the rise time and fall time of edge transitions of data transmitted by interface circuit 300. More specifically, edge rate control filter 340 receives the transmit signal comprising transmit data (for example data generated by processor 27) via amplifier 380 and conditions the transition edges of that transmit signal before supplying the transmit data to voltage-controlled variable resistance element 360 so as to control the EMI generated by interface circuit 300.

Edge rate control filter 340 may include a cascaded pair of filters, including a first cascaded filter and a second cascaded filter. In that case, the first filter includes decoupled charge and discharge paths so as to decouple the rise time of the transmit signal from the fall time of the transmit signal. As a result, in some embodiments edge rate control filter 340 may slow down the fall time of data transitions in the transmit signal to a lesser degree with respect to the rise time of data transitions in the transmit signal. Beneficially, edge rate control filter 340 may comprise a first-order low pass filter which may have a first time constant $\tau_C$ for the charging path and a second, different, time constant $\tau_D$ for the discharge path, where $\tau_D$ may be greater than $\tau_C$. The second cascaded filter of edge rate control filter 340 may have a voltage-dependent frequency characteristic. Beneficially, the second cascaded filter has a voltage-dependent frequency response such that its bandwidth is reduced in a voltage region where the resistance of voltage-controlled variable resistance element 360 is decreasing so as to pull the voltage on the DALI bus low. This may achieve a desirable additional slowdown of the falling edge transitions of the transmit signal on the DALI bus, which may otherwise be faster than the rising edge transitions. Accordingly, the overall EMI generated from interface circuit 300 may be reduced while still meeting the data transition time requirements of a DALI interface. Beneficially, the second cascaded filter may be a first-order low pass filter, which may have a variable time constant $\tau_{variable}$. Beneficially, the second cascaded filter has a cutoff frequency which decreases when the input voltage to the second cascaded filter increases and is greater than a threshold value. In some embodiments, the threshold value equals a threshold voltage of a FET employed for voltage-controlled variable resistance element 360. In some embodiments, the second cascaded filter includes a shunt capacitance between an output of the second cascaded filter and the negative output terminal of diode bridge 210, wherein the shunt capacitance increases when the input voltage to the second cascaded filter increases and is greater than the threshold value. Beneficially, the time constant $\tau_{variable}$ of the second cascaded filter may be less than the time constants $\tau_C$ and $\tau_D$ of the first cascaded filter. Beneficially, edge rate control filter 340 may be referenced with respect to the negative output terminal of diode bridge 210. In similarity to interface circuit 200, in some embodiments of edge rate control filter 340 the second cascaded filter may be omitted, thereby providing an advantage of simplicity but in some cases incurring a disadvantage in terms of reduced flexibility and degraded EMI performance.

Transmit voltage supply 325 is connected in series with h first unidirectional device 345 (e.g., a diode) between the output of current limiter 315 and the negative output terminal of diode bridge 210. Transmit voltage supply 325 is supplied by current from the DALI-bus via current limiter 315 and first unidirectional device 345, and supplies a supply voltage to amplifier 380. First unidirectional device 345 allows current to flow from the output of current limiter 315 to charge transmit voltage supply 325, but prevents a current from flowing in the opposite direction from transmit voltage supply 325 to current limiter 315 and/or first optocoupler 320 (e.g., when the receive signal corresponds to a low voltage-differential on the DALI bus). Accordingly, first unidirectional device 345 prevents the voltage of transmit voltage supply 325 from discharging through current limiter 315 and/or first optocoupler 320.

Transmit voltage reference 335 is connected between the second input terminal of first optocoupler 320 and the negative output terminal of diode bridge 210 and indirectly sets the amplitude of the voltage swing at the output terminal of amplifier 380. In some embodiments, transmit voltage reference 335 may comprise a Zener diode. In some embodiments, the Zener diode has a breakdown (Zener knee) voltage that is in a range of approximately 4.7 volts to 6.2 volts, particularly about 5.6 volts.

Figure 4:
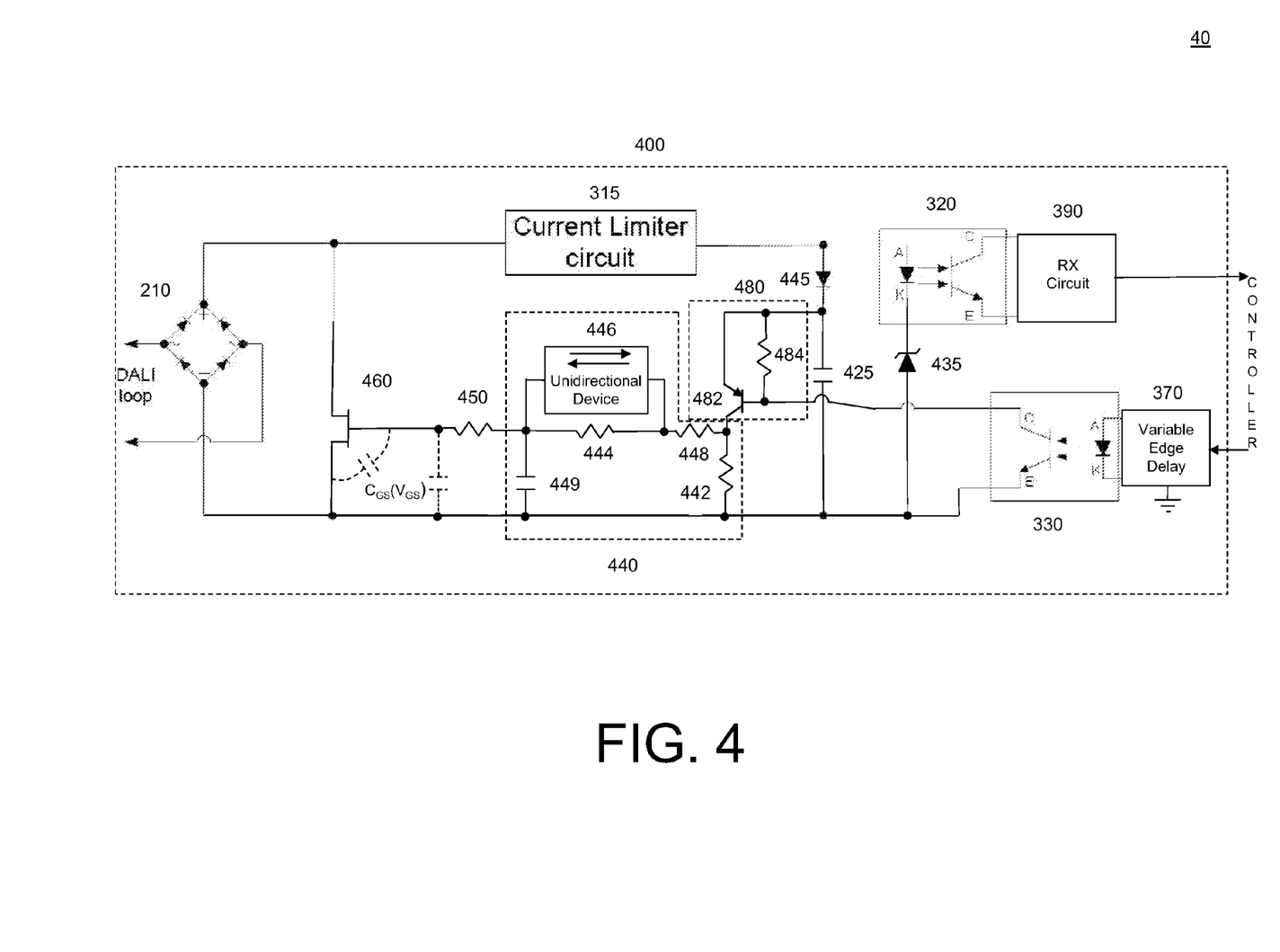
FIG. 4 is a circuit diagram of one embodiment of an interface circuit for interfacing a device to a DALI bus.

FIG. 4 is a circuit diagram of another embodiment of an interface circuit 400 for interfacing a DALI device 40 to a DALI bus. In particular, interface circuit 400 may be one example embodiment of interface circuit 200 and/or 300.

Interface circuit 400 includes: diode bridge 210; first optocoupler 320; second optocoupler 330; a first filter 440; a second filter 450; a field effect transistor 460; an amplifier 480; a transmit supply storage capacitor 425; a Zener diode 435; current limiter 315; and a diode 445.

For brevity, the descriptions of elements of interface circuit 400 which are identical to those in interface circuit 200 and/or 300 will not be repeated.

Supply storage capacitor 425 is illustrated as one example embodiment of transmit voltage supply 325 of interface circuit 300, and diode 445 is illustrated as one example embodiment of first unidirectional device 345 of interface circuit 300. Zener diode 435 is illustrated as one example embodiment of transmit voltage reference 335 of interface circuit 300.

Field effect transistor (FET) 460 is illustrated as one example embodiment of voltage-controlled variable resistance element 360 of FIG. 3.

In interface circuit 400, first filter 440 is a first-order low pass filter. First filter 440 includes: a shunt resistor 442 connected between the input terminal of first filter 440 and the negative terminal of diode bridge 210; first and second series resistors 444 and 448, respectively, connected between the input terminal of first filter 440 and the output terminal of first filter 440; a second unidirectional device 446 connected in parallel with either first series resistor 444 or second series resistor 448 (e.g., first series resistor 444 in FIG. 4); and a shunt capacitor 449 connected between the output terminal of first filter 440 and the negative output terminal of diode bridge 210. In some embodiments, second series resistor 448 may be omitted (shorted). In some embodiments, second unidirectional device 446 may be a diode. By means of second unidirectional device 446, first filter 440 decouples the charge and discharge paths so as to decouple the rise time of the transmit signal from the fall time of the transmit signal. In some embodiments, second unidirectional device 446 may be configured to only pass current from the input of first filter 440 to the output of first filter 440 while preventing a current from passing therethrough from the output of first filter 440 to the input of first filter 440. In other embodiments, second unidirectional device 446 may be configured to only pass current from the output of first filter 440 to the input of first filter 440 while preventing a current from passing therethrough from the input of first filter 440 to the output of first filter 440. More specifically, first filter 440 has a first time constant $\bullet_C$ for the charging path and a second, different, time constant $\bullet_D$ for the discharge path. In some beneficial embodiments, $\bullet_D$ is greater than $\bullet_C$. In that case, first filter 440 may slow down the fall time of data transitions in the transmit signal to a lesser degree with respect to the rise time of data transitions in the transmit signal. Due to the logic inversion through the FET 460, the opposite becomes true for the rise and fall times of the data transitions on the DALI bus.

In interface circuit 400, second filter 450 includes a series resistor connected between the output terminal of first filter 440 and a control terminal (e.g., the gate terminal) of field effect transistor 460, where the latter terminal is the capacitive node of the second filter 450. Optionally, second filter 450 also includes a shunt capacitor between the control terminal (e.g., the gate terminal) of field effect transistor 460 and the negative output terminal of diode bridge 210, which is in parallel with the parasitic gate-to-source capacitance $C_{GS}$ of field effect transistor 460. Beneficially, in second filter 450 the shunt capacitance between the gate terminal of field effect transistor 460 and the negative output terminal of diode bridge 210 increases when the input voltage to second filter 450 increases and is greater than a threshold value. Beneficially, the threshold value may equal the threshold voltage $V_{TH}$ of field effect transistor 460. In some embodiments, the shunt capacitor of second filter 450 may be omitted and the shunt capacitance of second filter 450 is realized by the parasitic gate-to-source capacitance $C_{GS}$ of field effect transistor 460, which beneficially is a function of the gate-to-source voltage $V_{Gs}$: $C_{GS}$ ($V_{GS}$). More specifically, the gate-to-source capacitance $C_{GS}$ of field effect transistor 460 increases as the gate-to-source voltage increases when the gate-to-source voltage is greater than the threshold voltage $V_{TH}$.

In similarity to interface circuits 200 and 300, in some embodiments of interface circuit 400, second filter 450 may be omitted. More specifically, the series resistor and shunt capacitor may be omitted, in which case the parasitic capacitance of field effect transistor 460 will still be present. Accordingly, the value of the shunt capacitor in first filter 440 should be reduced compared to an embodiment where both the first and second filters 440 and 450 are present.

In interface circuit 400, amplifier 480 receives the transmit signal from second optocoupler 330 and out puts the transmit signal to first filter 440. Amplifier 480 includes a PNP transistor 482 having an emitter connected to transmit voltage supply (storage capacitor) 425, a base connected to a first output terminal (i.e., connected to the collector of the output transistor) of second optocoupler 330, and a collector connected to an input terminal of first filter 440; and a resistor 484 connected between the base and the emitter of PNP transistor 482. In some embodiments, resistor 484 may have a value of 1-3 k•. Beneficially, amplifier 480 allows the output transistor of second optocoupler 330 to remain in an active region while interface circuit 400 transmits the transmit signal.

PNP transistor 482 may have a variable (gain-dependent) falling edge delay larger than its rising edge delay, because of the inherent storage time when coming out of saturation. In that case, variable edge delay circuit 370 (whose output should have the same polarity with the output of the amplifier 480, due to the two intermediate inversions) may be configured to delay rising edges of the transmit signal substantially more than falling edges of the transmit signal to compensate for the increased delay applied to falling edges by PNP transistor 482 and to thereby reduce or eliminate a duty cycle asymmetry introduced into the transmit signal by PNP transistor 482. Variable edge delay circuit 370 may also compensate for duty cycle asymmetry introduced into the transmit signal by other components of interface circuit 400, including for example second optocoupler 330.

As an alternative to PNP transistor 482 and resistor 484, in another embodiment amplifier 480 may comprise a current mirror having matched transistors and a resistor in series with the emitter of at least one of these matched transistors. That is, the current mirror may include a resistor in series with h the emitter of either, or both, of the matched transistors.

Figure 5A:
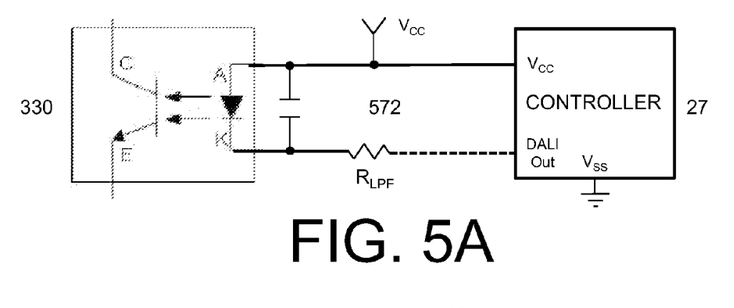
FIG. 5A-5C illustrate three example embodiments of a variable edge delay circuit of an interface circuit.
Figure 5B:
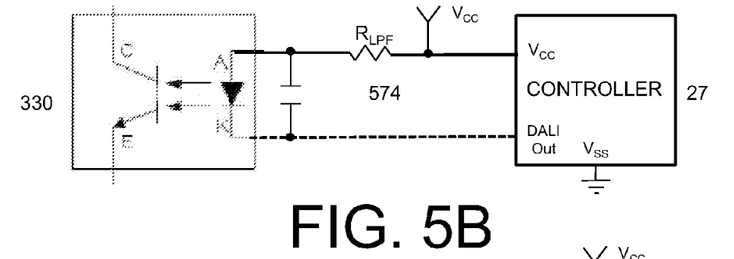
Figure 5C:
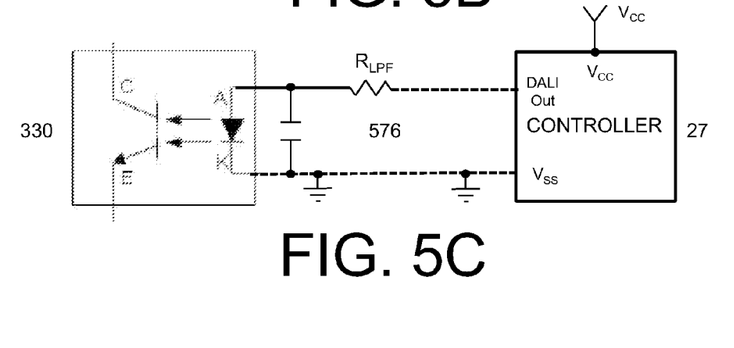

FIGS. 5A-5C illustrate three example embodiments of a variable edge delay circuit which may be employed in the interface circuits shown in FIGS. 2-4 and 6-7. Each of the variable edge delay circuits 572, 574 and 576 includes a low pass filter connected between a controller 27 and second optocoupler 330. In some embodiments, the input diode of second optocoupler 330 may have a forward voltage of 1.1V, and the supply voltage $V_{CC}$ may be 3.3 V, in which case the resistor $P_{LPF}$ may have a value of 2.2 k• so as to support a current of 1 mA through the diode. Because of the time (which is set by the values of $P_{LPF}$ and $C_{LPF}$) required to charge the capacitor to a voltage of about 1.1 V, to turn on the diode of optocoupler 330, a delay is applied by variable edge delay circuits 572, or 574, or 576 to the turn-on time of optocoupler 330 which is not similarly applied to the turn-off time for optocoupler 330. Accordingly, variable edge delay circuits 572, 574 and 576 may delay rising edges of the transmit signal substantially more than falling edges of the transmit signal which in come embodiments may compensate for an increased delay applied to falling edges by a transistor of an amplifier in the interface circuit.

Figure 6:
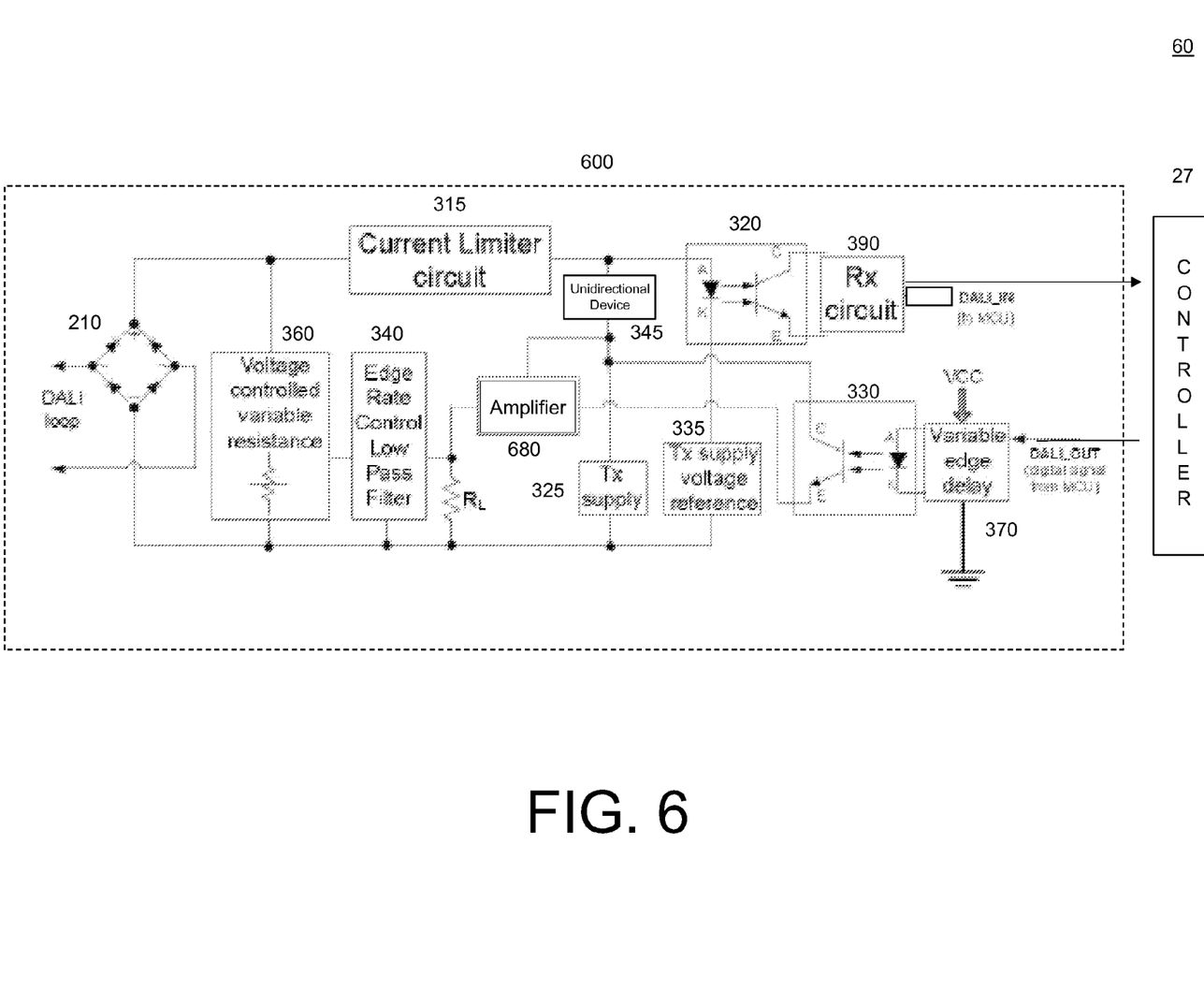
FIG. 6 is a detailed block diagram of another embodiment of a device having an interface circuit for interfacing the device to a DALI bus.

FIG. 6 is a detailed block diagram of another embodiment of a device 60 having an interface circuit for interfacing the device to a DALI bus. Device 60 is similar to device 40, except that in device 60 the output transistor of second optocoupler 330 drives an amplifier 680 through its emitter, rather than through its collector as in device 40. Accordingly, in some embodiments the output transistor of second optocoupler 330 operates in a saturated region. Also, the collector of the output transistor of second optocoupler 330 in device 60 is connected to transmit voltage supply 325.

Amplifier 680 has an input terminal, an output terminal, and a supply terminal. As noted above, in interface 600 of device 60, the input terminal of amplifier 680 is connected to a second output terminal of second optocoupler which is connected to the emitter of the output transistor of second optocoupler 330. The output terminal of amplifier 680 is connected to the input terminal of edge rate control filter 340, across the load resistor Ft, and the supply terminal of amplifier 680 is connected to transmit voltage supply 325. Amplifier 680 receives the transmit signal from second optocoupler 330 and provides the transmit signal to edge rate control filter 340. In some embodiments, the output transistor of second optocoupler 330 operates in a saturated region while interface circuit 600 transmits the transmit signal.

Figure 7:
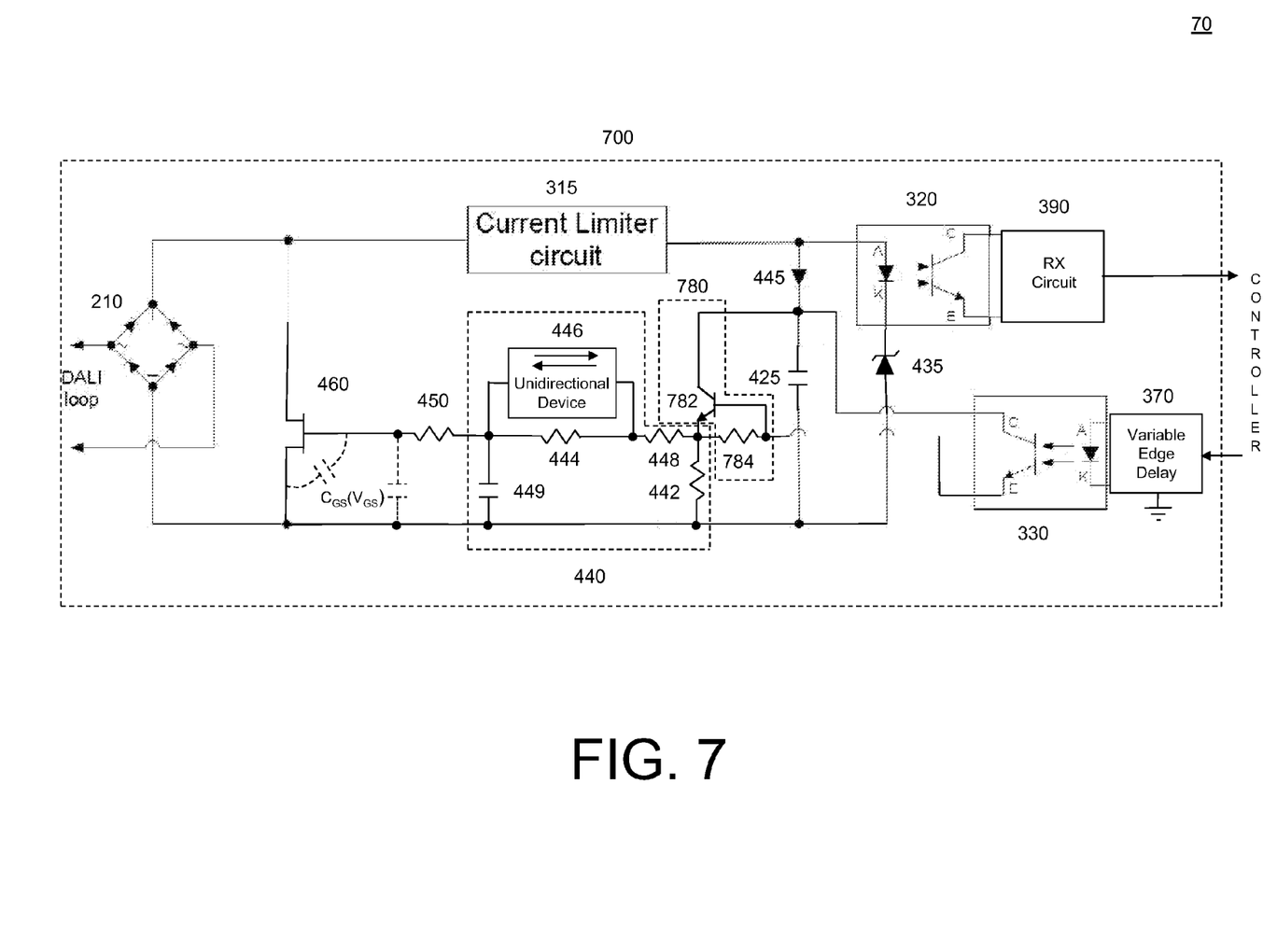
FIG. 7 is a circuit diagram of another embodiment of an interface circuit for interfacing a device to a DALI bus.

FIG. 7 is a circuit diagram of another embodiment of an interface circuit 700 for interfacing a DALI device 70 to a DALI bus. In particular, interface circuit 700 may be one example embodiment of interface circuit 200 and/or 600.

In interface circuit 700, amplifier 780 receives the transmit signal from second optocoupler 330 and out puts the transmit signal to first filter 440. Amplifier 780 includes an NPN transistor 782 having a collector connected to transmit voltage supply (storage capacitor) 425, abase connected to a second output terminal (i.e., connected to the emitter of the output transistor) of second optocoupler 330, and an emitter connected to an input terminal of first filter 440; and a resistor 784 connected between the base and the emitter of NPN transistor 782. In some embodiments, resistor 484 may have a value of 2-3 k•. Beneficially, the output transistor of second optocoupler 330 to remain in a saturated region while interface circuit 700 transmits the "low" (logic 0) transmit signal.

In particular, it is noted that NPN transistor 782 of amplifier 780 forms a Darlington pair with the output transistor of optocoupler 330.

Figure 8:
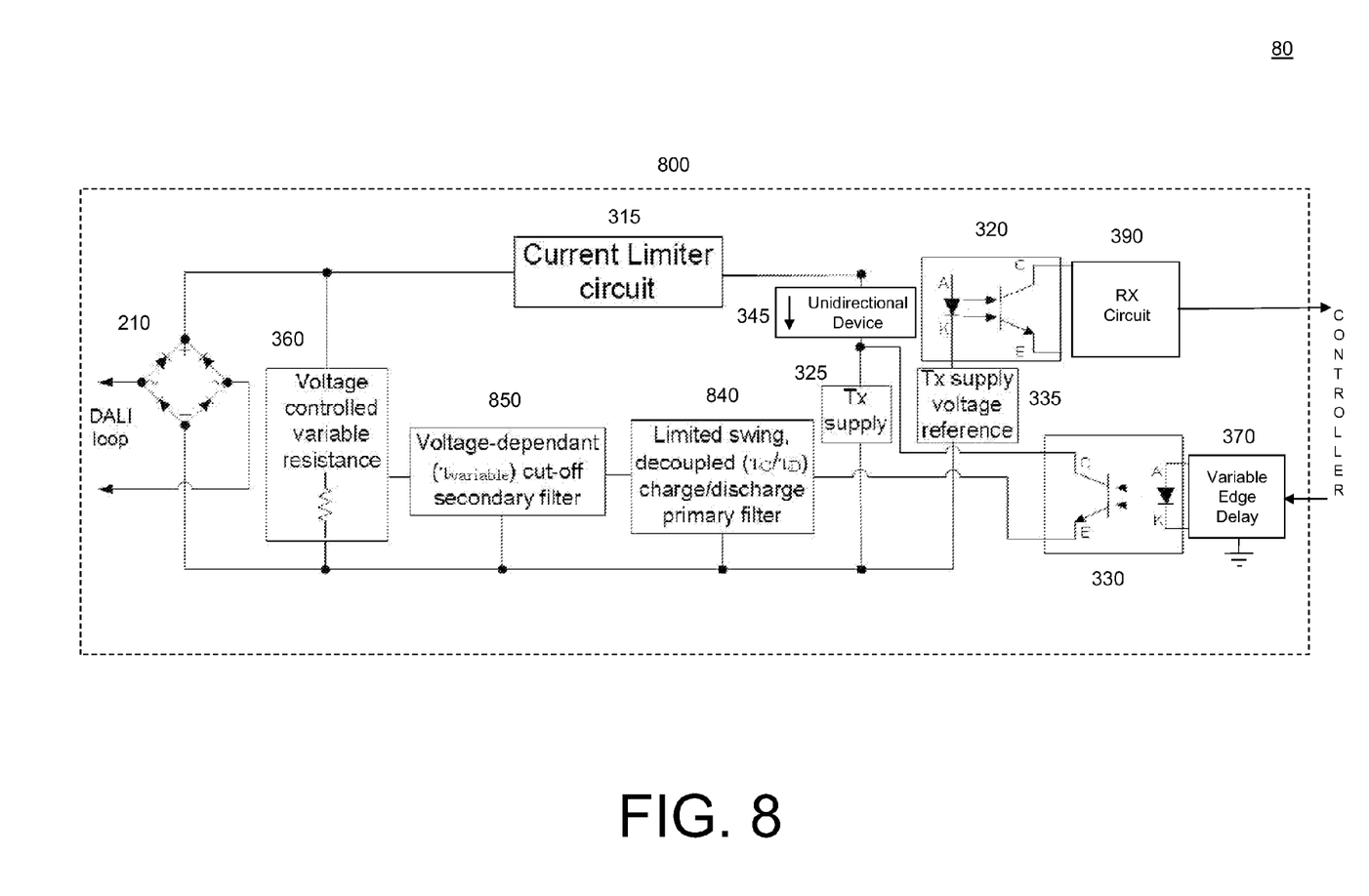
FIG. 8 is a detailed block diagram of yet another embodiment of an interface circuit for interfacing a device to a DALI bus.

FIG. 8 is a detailed block diagram of yet another embodiment of an interface circuit 800 for interfacing a DALI device 80 to a DALI bus. Interface circuit 800 is similar to interface circuit 600, except that interface circuit 800 does not include an amplifier. FIG. 8 explicitly shows a first filter 840 and a second filter 850 corresponding to elements 240 and 250 of FIG. 2, and as described above with respect to FIG. 2 as cascaded filters.

Other variations are possible. For example, in some embodiments duty cycle compensation may be provided without separate edge rate control. In that case, the edge rate control low pass filter may be omitted from interface circuits 300 or 600, or the corresponding components may be omitted from interface circuits 400, 700 or 800. Different embodiments of interface circuits may include various combinations of the features of the amplifier, the edge rate control low pass filter, and the variable edge delay circuit. Also, as indicated above, the variable edge delay circuit may be connected at the output side of the second galvanic isolation device (e.g., optocoupler), inserted between any two blocks in the series circuit path between the second galvanic isolation device and the voltage-controlled variable resistance element.

It should be understood that although, to provide a concrete illustration, example embodiments have been described above in the context of a DALI device interfacing to a DALI bus, the concepts described above need not be so limited, and can be applied to other communication interfaces for other networks, systems, buses or loops, and in particular to a communication interface for a line-pair.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless dearly indicated to the contrary, in any methods claimed herein that include more than one step or act, the order of the steps or acts of the method is not necessarily limited to the order in which the steps or acts of the method are recited.

Also, reference numerals appearing in the claims in parentheses, if any, are provided merely for convenience and should not be construed as limiting the claims in any way.

The invention claimed is:

1. A device comprising:
    an interface circuit configured to interface a controller with a Digital Addressable Lighting Interface (DALI) bus, wherein the interface circuit comprises:
        a diode bridge having polarity-independent input terminals configured to be coupled to the DALI bus, and further having a positive output terminal and a negative output terminal;
        a variable edge delay circuit configured to receive a transmit signal generated by the controller and to delay rising edges of the transmit signal substantially more than falling edges of the transmit signal, or to delay falling edges of the transmit signal substantially more than rising edges of the transmit signal;
        an optocoupler having a pair of input terminals configured to receive the transmit signal from the variable edge delay circuit and having first and second output terminals;
        an amplifier having an input terminal and an output terminal, wherein the input terminal is connected to one of the first and second output terminals of the optocoupler;
        a voltage-controlled variable resistance element connected across the positive and negative output terminals of the diode bridge, and having a control terminal for varying a resistance thereof; and
        a first filter connected between the output terminal of the amplifier and the control terminal of the voltage-controlled variable resistance element, wherein the first filter includes decoupled charge and discharge paths so as to decouple a rise time of the transmit signal from a fall time of the transmit signal,
        wherein the voltage-controlled variable resistance element is configured to couple the transmit signal to the DALI bus via the diode bridge.

2. The device of claim 1, wherein the variable edge delay circuit comprises a low pass filter.

3. The device of claim 1, wherein the interface circuit further comprises a transmit voltage supply and a transmit voltage reference for setting a voltage of the transmit voltage supply, wherein the transmit voltage supply is connected to a supply terminal of the amplifier, and wherein the transmit voltage reference is supplied a current from the DALI bus.

4. The device of claim 3, wherein the optocoupler includes a transistor, wherein the first output terminal of the optocoupler is connected to a collector of the transistor and the second output terminal of the optocoupler is connected to an emitter of the transistor, and wherein the input terminal of the amplifier is connected to the first output terminal of the optocoupler.

5. The device of claim 4, wherein the amplifier comprises:
    a PNP transistor having an emitter connected to the transmit voltage supply, a base connected to the first output terminal of the optocoupler, and a collector connected to an input terminal of the first filter; and
    a resistor connected between the base and the emitter of the PNP transistor.

6. The device of claim 4, wherein the variable edge delay circuit is configured to delay rising edges of the transmit signal substantially more than falling edges of the transmit signal.

7. The device of claim 4, wherein the amplifier comprises a current mirror having a pair of matched transistors and at least one resistor in series with an emitter of at least one of the matched transistors.

8. The device of claim 4, wherein the transistor of the optocoupler operates in an active region while communicating the transmit signal to the input terminal of the amplifier.

9. The device of claim 3, wherein the optocoupler includes a transistor, wherein the first output terminal of the optocoupler is connected to a collector of the transistor and the second output terminal of the optocoupler is connected to an emitter of the transistor, and wherein the input terminal of the amplifier is connected to the second output terminal of the optocoupler.

10. The device of claim 9, wherein the amplifier comprises a transistor, and wherein the transistor of the amplifier forms a Darlington pair with the transistor of the optocoupler.

11. The device of claim 9, wherein the transistor of the optocoupler operates in a saturated region while communicating the transmit signal to the input terminal of the amplifier.

* * * * *